United States Patent [19]

Bergman

[11] 4,275,983

[45] Jun. 30, 1981

[54] AIR FLOAT FIXTURE CLAMPING SYSTEM

[76] Inventor: Raymond A. Bergman, 107 E. Second St., Minster, Ohio 45865

[21] Appl. No.: 40,072

[22] Filed: May 17, 1979

Related U.S. Application Data

[60] Continuation-in-part of Ser. No. 924,958, Jul. 17, 1978, Pat. No. 4,179,106, which is a continuation of Ser. No. 815,676, Jul. 14, 1977, abandoned, which is a division of Ser. No. 684,725, May 10, 1976, Pat. No. 4,058,885.

[51] Int. Cl.³ ............................................. B23Q 7/00
[52] U.S. Cl. .................................... 414/676; 198/345; 269/20; 269/329
[58] Field of Search .................. 414/676; 29/559, 563; 269/20, 99, 100, 321 A; 408/56, 67, 69, 76; 406/87, 88; 410/68, 72–76, 105, 107, 111; 248/500, 507, 508, 509, 680, 681; 198/345, 472

[56] References Cited

U.S. PATENT DOCUMENTS

| | | | |
|---|---|---|---|
| 416,244 | 12/1889 | Weller | 269/100 X |
| 1,765,727 | 6/1930 | Kurowski | 248/680 |
| 2,885,915 | 5/1959 | Schurger | 269/69 |
| 3,209,623 | 10/1965 | Schardt | 269/20 X |
| 3,272,359 | 9/1966 | Thomas et al. | 414/676 X |
| 3,693,965 | 9/1972 | Mitsengendler | 269/20 |
| 3,807,035 | 4/1974 | Moorman et al. | 408/76 X |
| 3,942,780 | 3/1976 | Clement | 269/321 A X |

FOREIGN PATENT DOCUMENTS 46-8069  3/1971  Japan ................... 269/321 A Primary Examiner—Leslie J. Paperner
Attorney, Agent, or Firm—Albert L. Jeffers; John F. Hoffman

[57] ABSTRACT

A clamping system for use in air float tables in machine tool and other environments wherein the workpiece supporting fixture is supported on a cushion of pressurized air established between it and the surface of the table. The clamping system comprises one or more T-clamps mounted within the table for vertical rectilinear movement under the action of a pneumatic or hydraulic cylinder, and a T-slot in the lower surface of the fixture which is capable of receiving the T-clamps, preferably through enlarged entry openings at various places along the slot. With the T-clamps received in the T-slots in unclamped condition, the fixture is guided by the T-clamps as it is moved about on the table. When the fixture has been located in the desired position, pneumatic or hydraulic pressure is applied to the cylinder thereby drawing the T-clamps downwardly so that they clamp the fixture to the table. The T-slots may be arranged in a number of different patterns, for example, orthogonally related straight slots, circularly arranged arcuate slots, and closed circular slots. This arrangement permits the fixture to be easily moved about on the table in a controlled manner, accurately located, and then clamped in place with minimal effort required on the part of the machine tool operator, as in the case where the air float system is part of a machine tool, such as a milling machine, boring machine, etc.

33 Claims, 16 Drawing Figures

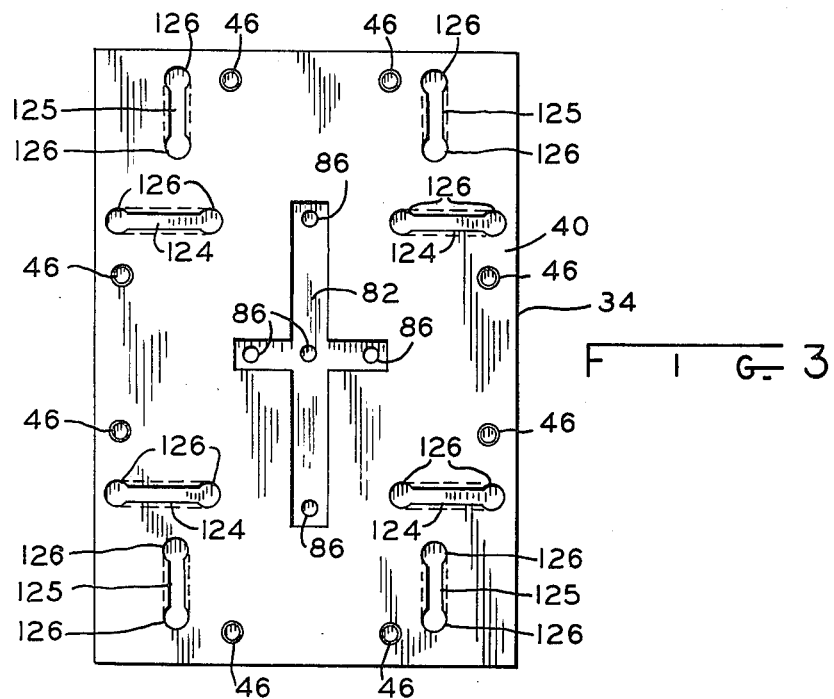
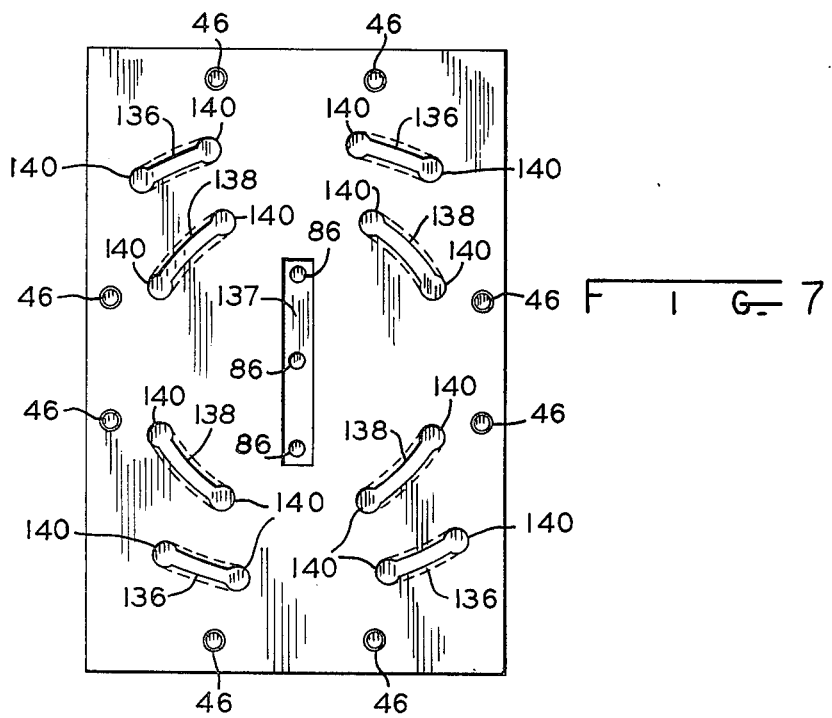

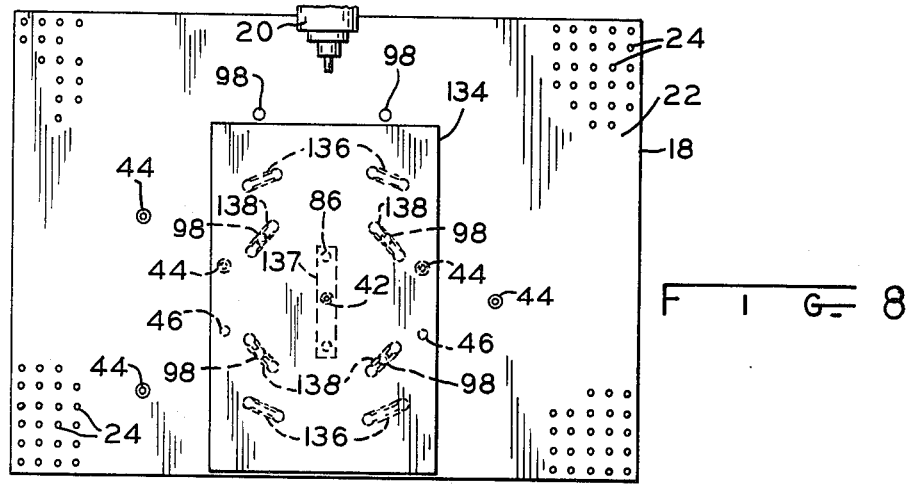
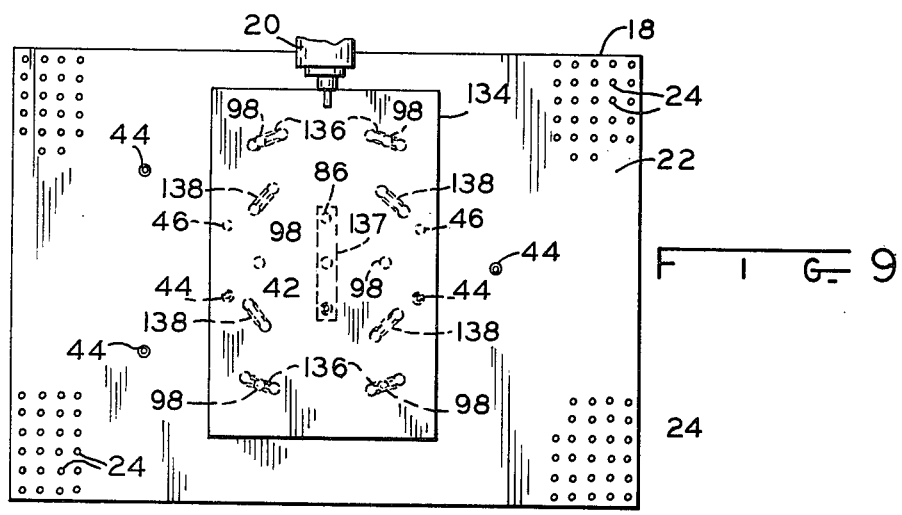
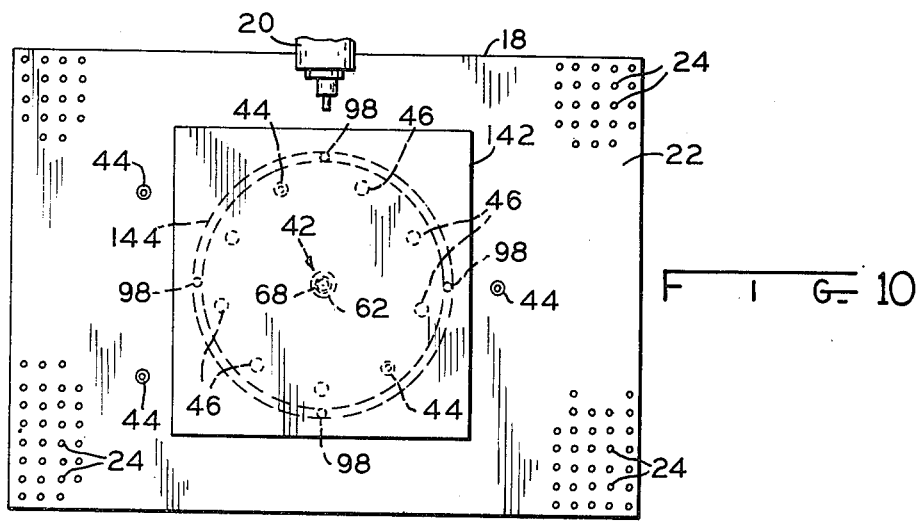

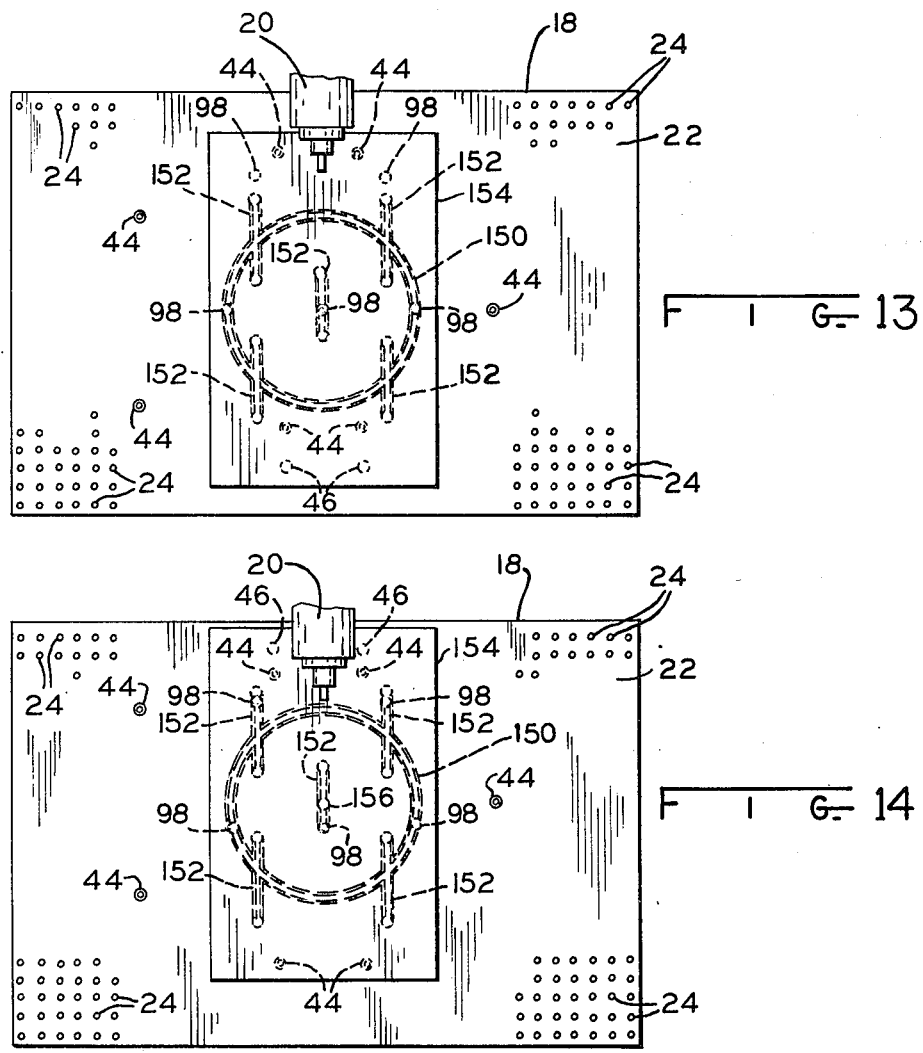

AIR FLOAT FIXTURE CLAMPING SYSTEM

CROSS REFERENCE TO RELATED APPLICATIONS

This is a continuation-in-part of application Ser. No. 924,958 filed July 17, 1978, now U.S. Pat. No. 4,179,106, which is a continuation of application Ser. No. 815,676 filed July 14, 1977 now abandoned, which is a division of application Ser. No. 684,725 filed May 10, 1976, now U.S. Pat. No. 4,058,885.

BACKGROUND OF THE INVENTION

The present invention relates to an air float fixture support system for machine tool and other environments, and in particular to an automatic clamping system for clamping the fixture in place once it has been located on the air float table. Although the system is adapted for use in a variety of applications, it is most particularly suited for use in a machine tool environment wherein it is necessary to accurately locate and then clamp workpieces is a machining station.

The machining of large workpieces has often involved very difficult positioning and repositioning of the workpiece when the various portions thereof are machined. In many cases, it is necessary to use hoists for elevating and moving the workpiece about both to and from the machine tool table, and on the table itself where repositioning is necessary for sequential machining steps.

In order to overcome these problems, an air float system, wherein the workpiece is mounted to a fixture which in turn is supported on a film of pressurized air, has been developed. This system is described in detail in U.S. Pat. No. 4,058,885 in the name of Raymond A. Bergman, which patent is incorporated herein by reference. In the system, a table is provided with fluid passages and a plurality of fluid outlets distributed over the surface of the table so that a cushion of pressurized air may be provided underneath the workpiece fixture. By virtue of the fluid pressure film, substantially friction-free movement of the fixture on the table is possible thereby permitting positioning and repositioning to be accomplished by a single operator without the need for hoisting equipment.

In order for the fixture to be rotated and translated from one position to another, the table is provided with one or more retractable pivot pins which project upwardly from the table surface. The pins may either be received in a socket in the bottom of the fixture, in which case the fixture is constrained to move circularly on the table, or, alternatively, they may be received in one or more slots so that the fixture is not only rotatable but also translatable. Cooperating pairs of retractable pin and socket locating devices on the fixture and table provide for accurate location of the fixture in a variety of predetermined positions.

The table may be provided wth a dual centering pin feature if additional flexibility is desired in positioning and locating the fixture. The dual centering pin comprises an outer pin which is engagable with the fixture slots, and an inner pin received within the outer pin with means for causing the inner pin to extend upwardly out of the outer pin so as to engage holes in the slots. When the inner pin is retracted, the workpiece fixture is translatable on the table in engagement with the outer pin, and when the inner pin is extended and received within one of the fixture holes within the slots, the fixture may be rotated about it to the desired position.

In certain applications of air float systems of this type, as, for example, machine tool work tables, it is necessary to firmly clamp the workpiece supporting fixture in place during machining. Initially, conventional T-slots were provided in the upper surface of the air float table, and the slots were engaged by conventional T-clamps. The presence of T-slots on the surface of the table proved to be a problem, however, due to the loss of pneumatic pressure between the table and fixture. Subsequently, a bayonet clamping system was developed, which comprises a plurality of openings in the surface of the air float table engagable by lug-type or high pitch threaded pins which could be rapidly inserted and locked in place. Clamping pressure was transmitted to the fixture by means of conventional clamping bars, which were tightened down against the bayonet pins. By providing removable covers to close the unused female openings for the bayonet clamps, the problem of loss of pneumatic pressure was overcome. Such a system is described in pending U.S. No. 4,174,828 in the name of Raymond A Bergman.

One drawback to the bayonet clamping system is that manual insertion of the bayonet clamps by the machine tool operator is necessary. In the case of very large tables, it may be necessary for the operator to physically climb on the table in order to emplace the clamps. Furthermore, the clamps serve only to fix the pallet in place once it has been located, and play no role in the rough positioning of the fixture.

SUMMARY OF THE INVENTION

In order to overcome the problems and disadvantages of the prior clamping systems, and to enable the clamping system to serve the dual function of restraining the fixture against movement and assisting in guiding and positioning the fixture as it is moved from one position to another on the table, the present invention has provided an automatic clamping system wherein the fixture is clamped by means of elements in the table which engage the fixture from underneath.

In a preferred embodiment of the invention, one or more T-slots are machined in the lower surface of the fixture plate, and one or more retractable T-clamps are mounted within the table upper surface. The T-clamps are forced upwardly by pneumatic and/or spring pressure and enter the T-slots through enlarged entry openings contiguous to the slots. Once the T-clamps have entered the slots, the fixture is guided by the T-clamps until the locating pins engage their respective openings, and then hydraulic or pneumatic pressure is applied to the T-clamp retraction cylinders thereby causing them to be drawn downwardly toward the table surface so as to clamp the fixture in place. Because the fixture is rough positioned by the T-clamps and slots, matching the locating openings with the respective locating pins can be accomplished much more easily than previously.

A further advantage to this type of clamping system is that the fixture can be indexed on the air float table. For example, in the case where the T-slot is circular and a plurality of locating openings are provided in a circular locus, the fixture can be unclamped, rotated to the next position at which point the locating pin will be injected into the appropriate locating opening, and the fixture clamped in place, all within a very short span of time and without extensive manual positioning and clamping being required of the machine tool operator. Similar indexing can be accomplished through the use of a plurality of orthogonally related straight T-slots, and straight T-slots in combination with arcuate or circular T-slots.

In one embodiment of the present invention, a double air float table similar to that described in copending patent application 001,434 filed Jan. 8, 1979 is provided with a circular T-slot on the lower surface of the upper table, and this T-slot is engaged by a plurality of T-clamps reciprocatingly mounted in the lower air float table. The upper air float is provided with one or more fixtures, which are rotatable on the upper air float plate about respective centers by means of a pair of centering pins, and are accurately located by respective locating pins. This results in a dual indexing system whereby the two fixtures are rotatable in the upper plate, and the upper plate is rotatable on and capable of being indexed by the lower table. The T-clamp assists in guiding the upper table during rotation, and firmly clamps it in place at the desired indexed position.

Specifically, the present invention is a clamping system for use in a air float support system including a table having an upwardly facing upper surface adapted to support a workpiece fixture, a workpiece fixture having a lower surface in facing relationship with the table upper surface when the fixture is supported on the table upper surface, and means for supplying a cushion of fixture supporting pressurized air to the surface of the table whereby the fixture may be floatingly supported thereon. The clamping system comprises a clamp element movably mounted in the table and including a portion thereof overhanging the table, and retraction means in the table connected to the clamp element for selectively drawing at least the overhanging portion thereof toward the table. The fixture includes a slot in the lower surface thereof including means accommodating the entry of the clamp element overhanging portion, said clamp element adapted to be received in the slot. The slot includes a shoulder disposed beneath the overhanging portion of the clamp element when it is received in the slot such that the shoulder will be clamped by the overhanging portion when it is drawn toward the table.

BRIEF DESCRIPTION OF THE DRAWINGS

FIG. 3 is a bottom view of the fixture of FIG. 1;

FIG. 7 is a bottom view of a fixture plate according to another embodiment of the invention;

FIGS. 8 and 9 are plan views similar to FIG. 1 but incorporating the fixture of FIG. 7, wherein the fixture is shown in two alternative positions on the table;

FIG. 10 is a plan view similar to FIG. 1 of a further embodiment of the invention;

FIGS. 13 and 14 are plan views similar to FIG. 1 incorporating the fixture of FIG. 11;

DETAILED DESCRIPTION

Figure 1:
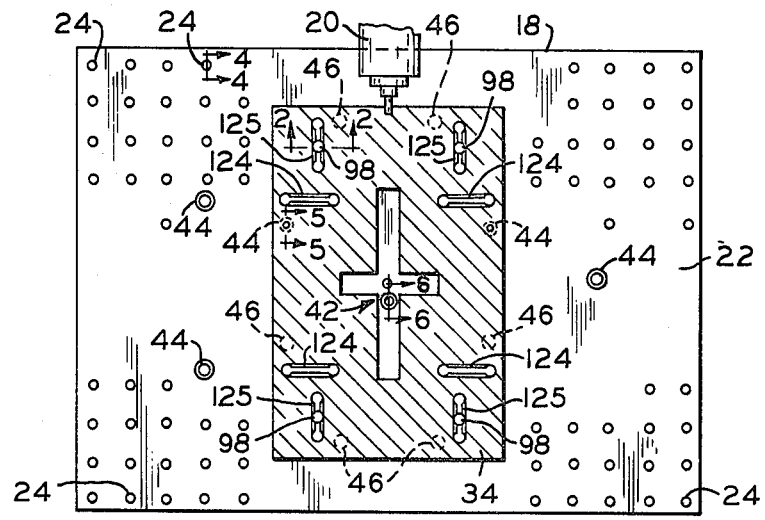
FIG. 1 is a plan view of an air float table and fixture incorporating the clamping system of the present invention.

Referring now to the drawings, there is illustrated in FIG. 1 an air float machine tool table 18 located in front of a machine tool 20. Table 18, although modified in accordance with the present invention, is generally of the type described in the aforementioned U.S. Pat. No. 4,058,885, and has a planar upper surface 22 provided with a plurality of openings 24 distributed over the surface of the table 18, and having ball check valves 26 mounted therein, the check valves 26 being shown in detail in FIG. 4.

Figure 4:
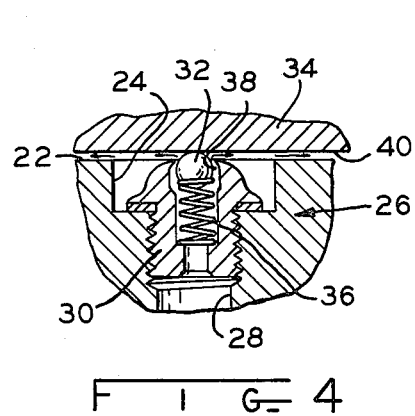
FIG. 4 is a sectional view taken along line 4—4 of FIG. 1 and viewed in the direction of the arrows.

Referring now to FIG. 4, it will be seen that valves 26 are threaded into openings connected with a fluid passageway network 28, which is connected to a source of pneumatic pressure, such as an air compressor, (not shown). Each valve 26 comprises a valve body 30, which is threaded into the upper portion of passage 26 and the top of body 30 is disposed beneath the upper surface 22 of table 18. Captive in the upper end of body 30 is a steel ball 32, which projects slightly above surface 22 such that it will be contacted by the fixture 34 when fixture 34 is positioned over it. A spring 36 continuously urges ball 32 into its closed position against valve seat 38.

When fixture 34, which is in the form of a large steel plate having a generally planar lower surface 40, is moved on table 18 until its downwardly facing lower surface 22 engages ball 32, the ball will be depressed as shown in FIG. 4 and admit fluid under pressure from passageway network 28 through the bore of valve body 30 and around ball 32 to the space between surfaces 22 and 40. The pressure of the fluid is selected such that a fluid film will be established between the surfaces, which will floatingly support fixture 34 and a workpiece mounted thereto (not shown) so that the fixture-workmember combination can easily be moved about on table 18 to any desired position. Sufficient openings 24 and valves 26 are provided to supply pneumatic pressure over the entire area of table 18 which is to be employed.

Figure 5:
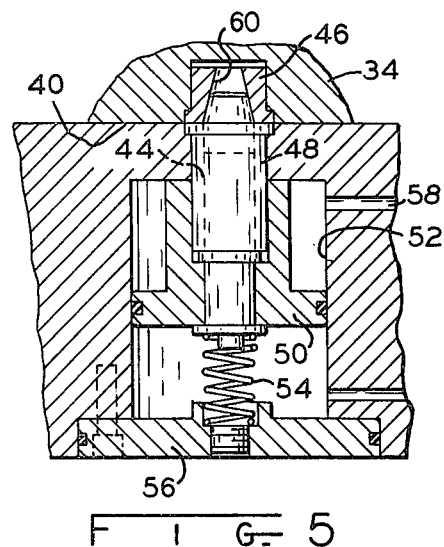
FIG. 5 is a sectional view taken along line 5—5 of FIG. 1 and viewed in the direction of the arrows.

Since it is essential that the fixture 34 occupy precisely located positions so that the workpiece in the fixture will be presented properly to the tool or tools which are to perform work thereon, a dual centering pin 42 and a plurality of locating pins 44 are provided in table 18. One of the locating pins 44 and one of its locating bushings 46 are illustrated in FIG. 5. Pins 44 may be hydraulically, pneumatically or spring actuated to protrude above the table surface 22 and engage correspondingly tapered sleeves or bushings 46 in the lower surface 40 of fixture plate 34 so as to accurately locate fixture plate 34 and the workpiece (not shown) mounted thereon in position for machining by tool 20.

More specifically, the locating pin and socket combinations 44 and 46 each comprise a bushing 48 within which pin 44 is slidably received, and the lower end of pin 44 is connected to piston 50. Piston 50 reciprocates within bore 52 and is biased upwardly by spring 54, bore 52 being closed at its lower end by vented plate 56.

In order to retract pin 44, fluid pressure is admitted to bore 52 through passageway 58 thereby causing piston 50 to be driven downwardly carrying with it pin 44. Fixture 34 is provided with a plurality of accurately located bushings 46 having tapered inner surfaces 60 adapted for the seating of pin 44 therein. It should be noted that locating pins 44 and bushings 46 must be very accurately placed on table 18 and fixture 34, respectively, since it is through them that accurate positioning of fixture 34 is accomplished. Any number of locating pins 44 and bushings 46 may be provided, depending on the number of located positions of fixture 34 which are desired.

Figure 6:
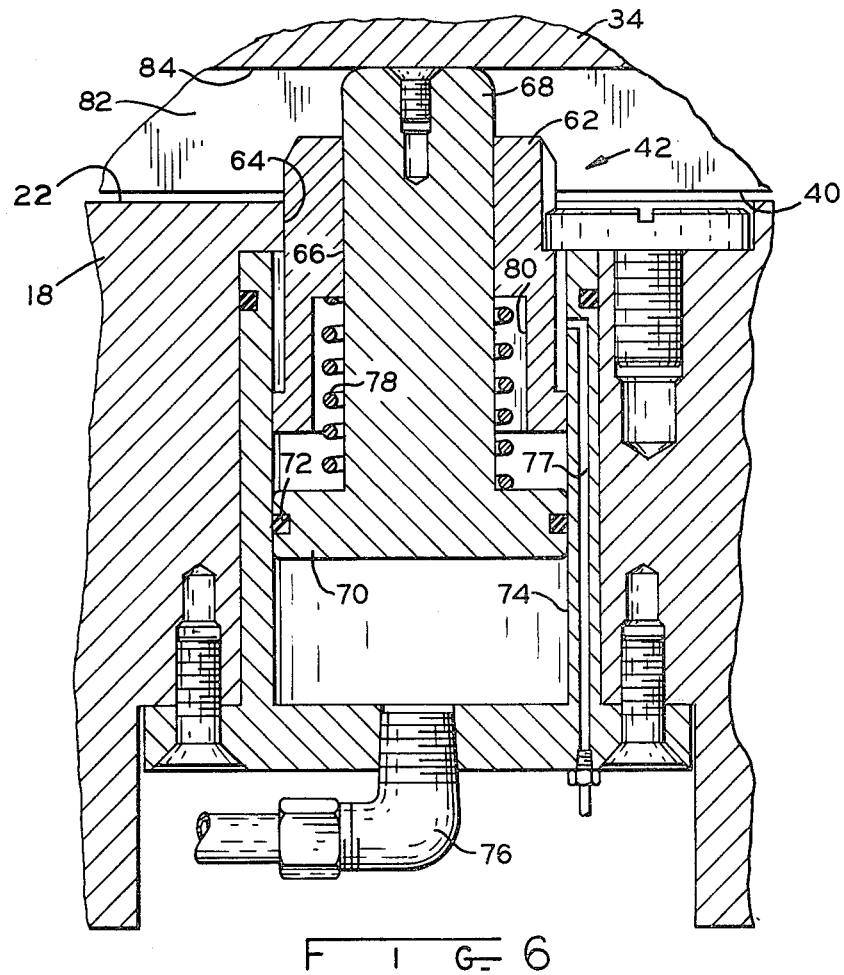
FIG. 6 is a sectional view taken along line 6—6 of FIG. 1 and viewed in the direction of the arrows.

Table 18 is also provided with one or more translation or centering pins 42, one of which is illustrated in detail in FIG. 6. Pin 42 may be of the dual centering type as disclosed in U.S. Pat. No. 4,143,868. Centering pin 42 comprises an outer pin 62 which is slidably received in bore 64, and an inner pin 66 comprising a smaller diameter upper portion 68 on a flange 70, which is provided with an annular seal 72. Inner pin 66, by virtue of flange 70 which serves as a piston, is reciprocatingly received within bore 74 and is extended by fluid pressure, either hydraulic or pneumatic, admitting into bore 74 through fluid line 76. A compression spring 78 is disposed between flange 70 and a counter bore 80 in outer pin 62, and serves to extend outer pin 62 upwardly when inner pin 66 is also extended. Outer pin 62 may be retracted by admitting hydraulic or pneumatic pressure through line 77.

Outer pin 62 is received within slot 82 in the lower surface 40 of fixture 34, which slot 82 comprises a pair of orthogonally related, intersecting branches. In the upper surface 84 of slot 82 are provided a plurality of recesses 86, which accommodate inner pin 68. Thus, fixture 34 may be guided as it moves on the upper surface 22 of table 18 by slot 82, which is adapted to capture outer pin 62. If it is desired to rotate fixture 34 about a fixed center, fluid pressure is admitted to bore 74 through line 76 thereby extending inner pin 68, and fixture 34 is moved until one of the centering openings 86 is positioned above inner pin 68. Due to the fluid pressure beneath it, inner pin 68 will then project into the opening 86 and enable fixture 34 to be rotated about this point. Pins 62 and 68 are preferably slightly tapered on their distal ends to compensate for any misalignment with the translation slot 82 and centering openings 86 on the lower surface 40 of fixture 34.

Figure 2:
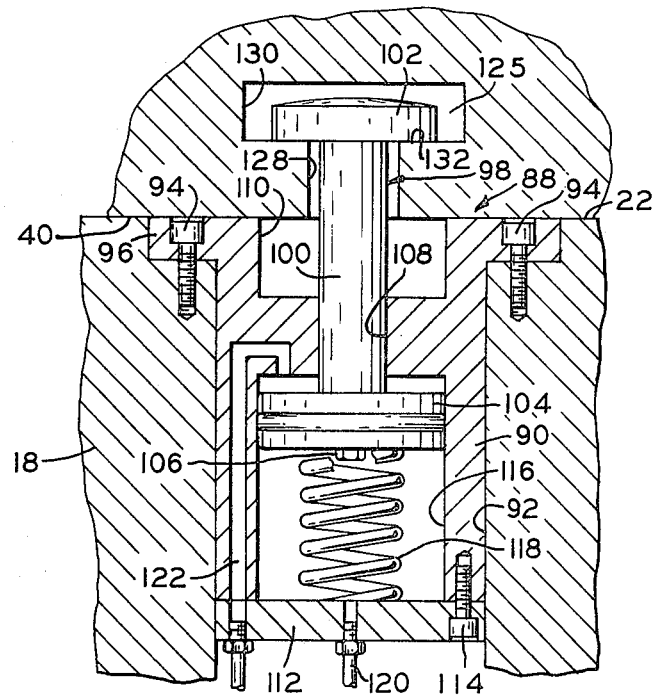
FIG. 2 is a sectional view taken line 2—2 of FIG. 1 and viewed in the direction of the arrows.

As discussed briefly above, the present invention is concerned with an automatic clamping system for both guiding the fixture 34 in its movement on table 18 and clamping it in position once it has been accurately located. Referring to FIGS. 1, 2 and 3, one embodiment of the present invention will now be described.

The clamping system comprises a plurality of clamp units 88 mounted within table 18 at fairly accurately located positions therein. Each clamp unit comprises a cylinder housing 90 received within an opening 92 in table 18 and secured thereto by screws 94, which pass through corresponding openings in a flange portion 96 of housing 90. Received within housing 90 for vertical rectilinear sliding movement is a T-clamp 98 comprising a cylindrical shank 100, a generally cylindrical enlarged head 102 integral with shank 100 and having a diameter greater than shank 100, and a piston 104 secured to shank 100 by screw 106. Shank 100 is slidably received within a bore 108 in housing 90, which is positioned beneath a cylindrical recess 110 in housing 90 adapted to receive head 102 such that, when T-clamp 98 is fully retracted, head 102 is positioned below the surface 22 of table 18. End plate 112, which is secured to housing 90 by screws 114, serves to seal the end of cylinder 116, within which piston 104 reciprocates.

T-clamp 98 is extended through the combined action of spring 118 and pneumatic or hydraulic fluid under pressure admitted to cylinder 116 through a line 120. T-clamp 98 is retracted by exhausting line 120 and admitting hydraulic or pneumatic pressure through line 122 above piston 104, thereby driving piston 104 and T-clamp 98 downwardly against the force of return spring 118.

Although T-clamp 98 has been shown as having a cylindrical shank 98 and head 102, other shapes and constructions are not precluded by the present invention. For example, clamp 98 could be L-shaped rather than T-shaped as in the present application, although this construction would not normally be preferred because a particular radial orientation of the head would be necessary to enable engagement with the fixture 34.

With particular reference to FIG. 3, it will be seen that the fixture plate 34 comprises a plurality of T-slots 124 and 125 on the lower surface 40 thereof. It will be noted that slots 124 are orthogonally related to slots 125. Each of the slots 124 and 125 comprises a pair of entry openings 126 on the ends thereof, which openings are sufficiently large in diameter to accommodate the insertion of T-clamp head 102 therein. Referring to FIG. 2, T-slots 124 and 125 each comprise a first portion 128 having generally vertical sidewalls and opening out onto surface 40, and a second portion 130, which is generally rectangular in cross section and wider than portion 128. It will be seen that portions 128 are dimensioned so as to accommodate shank 98, and portions 130 are dimensioned to accommodate head 102. With T-clamp 98 received within slot 125, when piston 104 is retracted, head 102 will be pulled downwardly against the shoulder 132 formed between portions 130 and 128 of slot 125. This will effect clamping of fixture 34 to table 18.

In operation, fixture 34 is loaded on table 18 such that outer translation pin 62 is received within slot 82. Fixture 34 is then supported on a cushion of air between it and table 18 as taught in the aforementioned U.S. Pat. No. 4,058,885, and is manually moved on the table until the four T-clamps 98 are positioned beneath respective entry openings 126 for slots 125, for example. Assuming that fluid pressure is admitted to cylinder 116 through pressure line 120 before this time, when the heads 102 of clamps 98 are located beneath entry openings 126 they will project upwardly into slots 125. At this point, fixture 34 can be guided on table 18 in a generally rectilinear direction of movement along the longitudinal axes of slot 125.

Locating pins 44 are forced upwardly by spring pressure against the lower surface 40 of fixture 34, when they are aligned with their respective tapered bushings 46, and project upwardly into bushings 46, and when then actuated by air pressure, will accurately locate fixture 34 on table 18. Fluid pressure will then be admitted to cylinder 116 through line 122 so as to retract clamps 98 thereby clamping fixture 34 to the upper surface 22 of table 18.

To be able to move fixture 34 rectilinearly in the other direction, the locating pins 44 are retracted, the clamps 98 released and fixture 34 is moved until the heads 102 of T-clamps 98 are positioned over entry openings 126, fluid pressure is admitted to cylinder through line 122 thereby retracting T-clamps 98, and fixture 34 is moved until T-clamps 98 are located over the entry openings 126 of T-slots 124. Then, the same sequence of events as discussed previously is accomplished. It wil be noted that translation slot 82 is provided with suitably positioned branches for translation pin 42 so that rectilinear motion of fixture 34 in the other direction is possible.

If it is desired to rotate fixture 34 about one of the centers of rotation defined by centering openings 86, all of the T-clamps 98 and locating pins 44 are retracted below the surface 22 of table 18, and inner rotation pin 68 is extended into the desired centering opening 86. It should be noted that in all cases where movement of fixture 34 on table 18 is effected, a cushion of pressurised air must be established between fixture 34 and the upper surface 22 of table 18. After fixture 34 has been located, the cushion of pressurized fluid is exhausted, and clamping can be accomplished. Once fixture 34 has been engaged by T-clamps 98, both the inner and outer centering pins 68 and 62 can be retracted.

With reference now to FIGS. 7, 8 and 9, a different arrangement of the T-slots and T-clamps is illustrated. For the sake of clarity, the same reference numerals will be employed for components which are identical to those shown in FIGS. 1 through 6.

Modified fixture 134 comprises a translation slot 137 having centering recesses 86 therein, a plurality of locating bushings 46 on the lower surface thereof, and two concentric rings of arcuate T-slots 136 and 138, respectively. Each of the T-slots 136 and 138 is provided with a pair of entry openings 140 on the opposite ends thereof, which are adapted to receive T-clamps 98.

T-clamps 98 are positioned such that, when fixture 134 is in the position shown in FIG. 8, they are capable of being received within the inner ring of arcuate T-slots 138. Centering pin 42 is positioned such that inner pin 68 will be received within the center centering opening 86. Thus, with locating pins 44 retracted, fixture 134 is capable of being rotated about the center of rotation defined by centering pin 42, and since T-slots 138 are arcuate and lie in a circle having as its center of rotation the center opening 86 in slot 36, fixture 134 will slide around T-slots 138. Fixture 134 can be clamped in any location simply by retracting T-clamps 98. If it is desired to accurately locate fixture 134 in the position shown, locating pins 44 are urged upwardly against the lower surface of fixture 134, which is then rotated from side to side until locating pins 44 project into their respective tapered bushings 46. At this point, fixture 134 can be clamped to table 18 by retracting T-clamps 98.

If it is desired to move fixture 134 closer to tool 20 to the position shown in FIG. 9, T-clamps 98 are released, the cushion of supporting air is again established between fixture 134 and table 18, fixture 134 is rotated until clamps 98 are located above entry openings 140, T-clamps 98 are retracted, and inner pin 68 is retracted out of the center opening 86. Fixture 134 is then pushed toward tool 20 until the inner centering pin 68 is aligned with the lowermost centering opening 86, at which point it will project therein. T-clamps 98 are then projected upwardly against the lower surface of fixture 134, which is turned until the upper two T-clamps 98 and the lower two T-clamps 98 are aligned with and project into the entry openings 140 for the outer ring of arcuate T-slots 136. Fixture 134 is then rotated from side to side until the next lower pair of tapered bushings 46 are aligned with locating pins 44, which have already been activated and will snap into place. With the fixture 134 now accurately located in the position shown in FIG. 9, air pressure is exhausted between fixture 134 and table 18 and the T-clamps 98 are retracted so as to apply clamping pressure.

Of course, a number of other positions for fixture 134 could be achieved depending on the number of locations of T-clamps 98 and locating pins 44.

Figure 11:
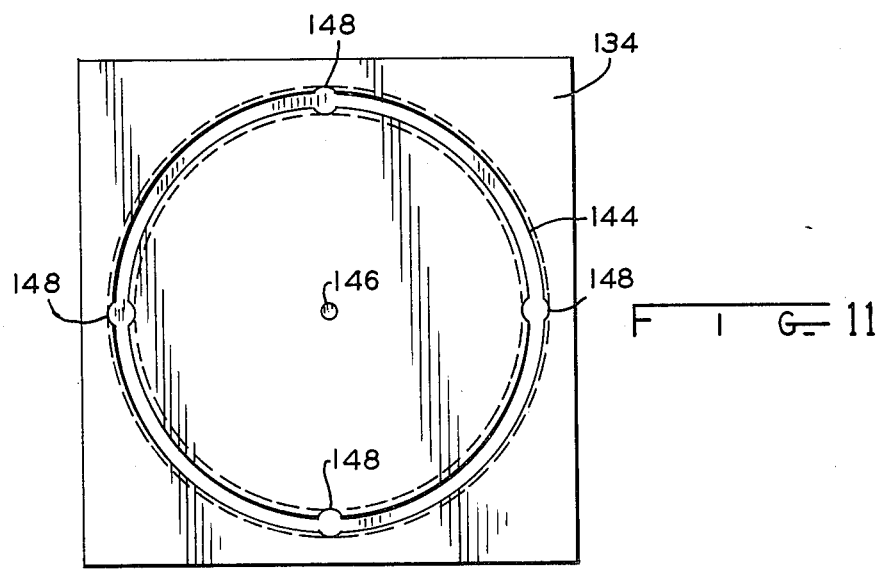
FIG. 11 is a bottom view of the fixture shown in FIG. 10.

FIGS. 10 and 11 illustrate yet another modified form of fixture plate 142, which is provided with a continuous, circular T-slot 144 having as its center a single centering opening 146 adapted to receive the inner pin 68 of dual centering pin 42. Four T-clamps 98 are provided, and are spaced equally distantly about dual centering pin 42. T-slot 144 is provided with four entry openings 148 adapted to receive the heads 102 of T-clamps 98. By virtue of this arrangement, fixture 142 is capable of being rotated to any position about centering pin 42 and then clamped in place in that position by retracting T-clamps 98. A pair of locating pins 44 and a plurality of tapered bushings 46 enable fixture 142 to be accurately indexed to any position.

Figure 12:
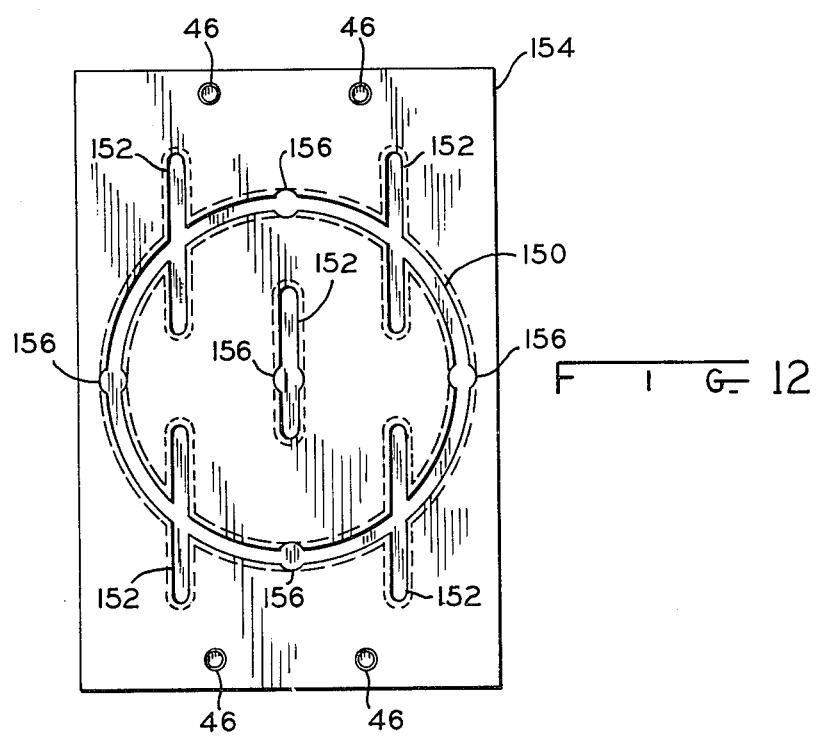
FIG. 12 is a bottom view of a fixture plate according to yet another embodiment of the invention.

As shown in FIGS. 12, 13 and 14, a circular T-slot 150 may be combined with a plurality of straight T-slots 152, thereby providing rotary and rectilinear movement capability for fixture 154. In this case, the entry openings 156 are provided on circular T-slot 150 and the center straight T-slot 152.

FIGS. 13 and 14 illustrate how fixture 154 can be shifted rectilinearly toward and away from tool 20. This would enable one side of the workpiece (not shown) mounted to fixture 154 to be moved close to tool 20 for machining and then, by withdrawing and rotating fixture 154 one hundred and eighty degrees, enable the opposite side to be brought close to tool 20 for machining. Similarly, one of the elongated sides could be machined close to the spindle 20, then rotated 90°, and translated backward away from the spindle 20 to enable the ends to be machined. A multiplicity of indexed rotary positions can also be achieved by capturing the circular T-slot with the appropriate T-clamps. A fixture 154 having this type of arrangement provides a tremendous amount of machining flexibility. Obviously, rectilinear movement in the other orthogonal direction can be achieved by providing a plurality of orthogonally related T-slots as shown in FIG. 1.

Figure 15:
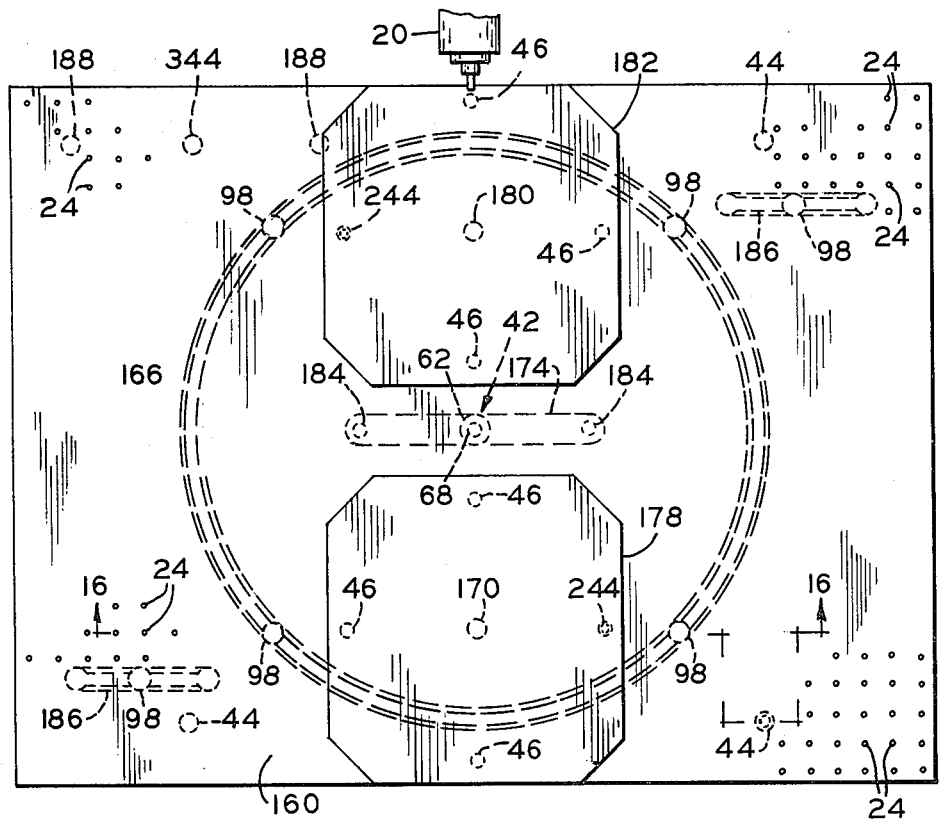
FIG. 15 is a plan view of a dual indexing system according to the present invention.
Figure 16:
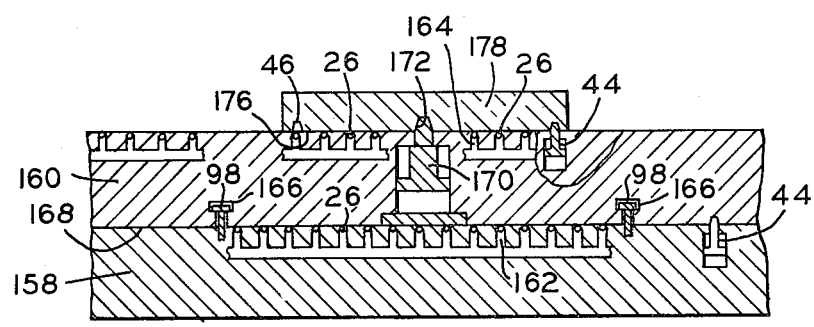
FIG. 16 is a sectional view taken along line 16—16 of FIG. 15 and viewed in the direction of the arrows.

Referring now to FIGS. 15 and 16, a dual indexing table arrangement is disclosed. This comprises a pair of air float tables 158 and 160 including pressurized air supply means 162 and 164 for providing cushions of air to their respective surfaces through check valves 26. FourT-clamps 98 mounted within lower table 158 are received within a continuous circular T-slot 166 in the lower surface 168 of upper table 160. Four locating pins 44 engage corresponding tapered sockets 46 so as to accurately locate upper table 160 on lower table 158 in any of four rotary positions.

Upper table 160 is provided with a single action centering pin 170, which engages a tapered centering opening 172 formed in the lower surface 176 of fixture 178 supported on table 160. A similar single acting centering pin 180 is provided in upper table 160 and aligned with a corresponding centering opening in the lower surface of a second fixture 182. Locating pins 244 mounted in upper table 160 each are positioned to engage four tapered locating bushings 46 in the lower surfaces 176 of fixtures 178 and 182 thereby providing four index positions for each of these fixtures 178 and 182.

Pressurized air is established between upper and lower tables 160 and 158, and upper table 160 is accurately positioned by engaging locating pins 44 and tapered locating bushings 46 in the lower and upper tables, respectively. T-clamps 98 are then retracted so that the upper table 160 is firmly held in place. Each of the four sides of fixture 182 is presented to tool 20 by establishing fluid pressure between upper table 160 and fixture 182, rotating fixture 182 to the desired orientation whereupon locating pin 244 will lock into the appropriate locating bushing 46, exhausting the pressurized air between fixture 182 and upper table 160, and then clamping the fixture 182 in place. Clamping could be accomplished by means of the previously discussed prior art T-clamp arrangement wherein T-slots are provided on the upper surface of upper tables 160, by the bayonet clamping system disclosed in U.S. Pat. No. 4,174,828, or by means of a circular T-slot and automatically retracted T-clamps as shown in FIG. 10. Alternatively, shorter, arcuate T-slots as shown in FIG. 8 may be utilized wherein the T-clamps are permitted to enter the arcuate slots through respective enlarged entry openings as described earlier.

When all four sides of the workpiece (not shown) mounted to fixture 182 have been machined, upper table 160 can be turned 180° on lower table 158 by unlocking T-clamps 98, establishing fluid pressure between tables 158 and 160, retracting the locating pins 44 in lower table 158, turning upper table 160 180° on lower table 158 until locating pins 44 again engage the respective locating bushings 44, exhausting fluid pressure between upper and lower tables 160 and 158, and retracting T-clamps 98 to clamp upper table 160 in place. The other fixture 178 can then be indexed to its four (or more) positions for machining of the workpiece mounted thereto.

A dual centering pin 42 comprising outer pin 62 and inner pin 68 is mounted in lower table 158. Outer pin 62 engages an elongated slot 174 in lower surface 168 of upper table 160 and inner pin 68 is positioned to engage a plurality of recesses 184 in the lower surface 168 of table 160. This enables upper table 160 to be translated on lower table 158 and to be accurately located in three different positions relative to tool 20. Clamping in these positions is accomplished by T-clamps 98 and elongated T-slots 186. Locating bushings 188 in upper table 160 cooperate with the upper left hand locating pin 344 to provide accurate location in each of the three translation positions enabled by slot 174.

Although certain specific arrangements of the T-slots and T-clamps have been shown in connection with various embodiments of the invention, it should be understood that any number of configurations could be employed depending on the situation. Furthermore, the present invention is not limited to machine tool environments, but could be utilized in other instances where accurate location and clamping are required.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. In a fluid fixture support system including a table having an upwardly facing upper surface adapted to support a workpiece fixture, a workpiece fixture having a lower surface in facing relationship with the table upper surface when the fixture is supported on the table upper surface, and means for supplying a cushion of fixture supporting pressurized fluid to the surface of the table whereby the fixture may be floatingly supported thereon, a fixture clamping system comprising: a clamp element movably mounted in said table and including a portion thereof overhanging said table, retraction means in said table connected to said clamp element for selectively drawing at least said overhanging portion toward said table, said fixture including an elongated slot in the lower surface thereof accommodating the clamp element overhanging portion therein, said clamp element adapted to be received in said slot, said slot including shoulder means disposed beneath the overhanging portion of said clamp element when said clamp element is received in said slot such that said shoulder means will be clamped by said overhanging portion when the overhanging portion is drawn toward said table, at least one opening in the lower surface of said fixture contiguous with said slot and being sufficiently large to permit said clamp element to project upwardly through said opening into said slot, whereby said clamp element and slot function to locate the fixture as it is moved over the surface of the table and enable the fixture to be immediately clamped in place by retracting the clamp element when the desired position of the fixture on the table has been reached.

2. The system of claim 1 wherein: said clamp element comprises a shank received in said table for vertical rectilinear movement, said overhanging portion comprises an enlarged head on said shank extending laterally beyond said shank in all directions, said slot is a T-slot adapted to receive the shank and head of said clamp element, and said opening is at least as large as the enlarged head of the clamp element.

3. The system of claim 2 wherein said retraction means comprises a fluid actuated piston and cylinder.

4. The system of claim 1 including: a plurality of said clamp elements, a plurality of said slots in the lower surface of said fixture, and wherein said clamp elements are engageable with respective said slots.

5. The system of claim 4 wherein: the lower surface of said fixture is planar and at least some of said slots are arcuate in the plane of the lower surface of said fixture.

6. The system of claim 1 wherein said clamp elements are selectively retracted below the surface of said table by said retraction means.

7. The system of claim 1 including at least one locating pin mounted in said table and selectively extendible upwardly from the surface of said table, and at least one locating opening in the lower surface of said fixture adapted to receive said locating pin so as to accurately locate said fixture on said table.

8. The system of claim 1 wherein: said fixture lower surface includes a second slot, and including a pin extending upwardly from said table surface and receivable in said second slot so as to guide said fixture on said table.

9. The system of claim 8 wherein said pin is selectively retractable below said table surface.

10. The system of claim 9 including a second pin concentric with said first mentioned pin, said second pin being extendible and retractable in and out of said first mentioned pin, at least one downwardly facing opening in said fixture second slot engageable by said second pin.

11. In an air float fixture support system including a table having an upwardly facing upper surface adapted to support a workpiece fixture, a workpiece fixture having a lower surface in facing relationship with the table upper surface wherein the fixture is supported on the table upper surface, and means for supplying a cushion of fixture supporting pressurized air to the surface of the table whereby the fixture may be floatingly supported thereon, a fixture clamping system comprising:
- a T-clamp having a shank received in said table for vertical reciprocating movement and a head having a diameter larger then the diameter of said shank,
- fluid motor means connected to said T-clamp for selectively extending and retracting said T-clamp above and below, respectively, the surface of said table,
- said fixture lower surface being generally planar and including a T-slot having its first portion opening out onto said fixture lower surface adapted to receive said shank, and a second portion above said first portion adapted to recieve said head, said slot being slidable around said T-clamp,
- said slot second portion being wider than said first portion such that a pair of upwardly facing shoulders are formed in said slot, said shoulders being engaged by said head portion when said T-clamp is retracted toward said table, and
- at least one entry opening in the lower surface of the fixture contiguous with said T-slot and being wider than said slot first portion to permit the head of said T-slot to project upwardly through said opening and into the second portion of said slot,
- whereby as said fixture is moved over the surface of the table and said entry opening is positioned over said T-clamp, said T-clamp can be extended through said opening into the second portion of the slot so that further movement of the fixture will cause said slot to slide over said T-clamp, and the fixture will be guided on said T-clamp as it moves over the surface of the table from one position to another.

12. The system of claim 11 wherein said retraction means comprises a cylinder mounted in said table and a piston received in said cylinder and connected to said shank.

13. The system of claim 12 including: a fluid line connected to said cylinder so as to depress the piston when fluid pressure is admitted to the cylinder through said line, and a return spring means for raising the piston when fluid pressure from said line is removed.

14. The system of claim 11 including a plurality of said T-clamps and fluid motor means and wherein said fixture includes a plurality of said T-slots positioned on the fixture to receive respective said T-clamps.

15. The system of claim 11 including a plurality of said T-clamps and fluid motor means, and wherein said fixture includes a plurality of said T-slots positioned so that given sets of said T-clamps are receivable in more than one set of said T-slots.

16. The system of claim 11 including a plurality of said T-clamps and fluid motor means, and wherein said fixture includes a plurality of said T-slots positioned on the fixture to receive certain ones of said T-clamps.

17. The system of claim 16 wherein said slots are generally straight and elongated and wherein the longitudinal axes of some of said slots are perpendicular to the longitudinal axes of the other slots.

18. The system of claim 16 wherein some of said slots are elongated and arcuate and are arranged such that their arcs collectively define a circle.

19. The system of claim 16 wherein some of said slots are elongated and arcuate and are arranged such that their arcs collectively define a plurality of circles.

20. The system of claim 19 wherein the circles defined by said arcuate slots are concentric.

21. The system of claim 19 including: a translation slot in said fixture lower surface, and a translation pin extending upwardly out of said table, said translation pin being receivable in said translation slot.

22. The system of claim 21 including a downwardly facing opening in said translation slot and a centering pin concentric with and extendible upwardly out of said translation pin, said centering pin being receivable in said downwardly facing opening.

23. The system of claim 11 wherein said T-slot forms a continuous circle.

24. The system of claim 23 and including a plurality of said T-clamps and fluid motor means, said T-clamps being received within said T-slot.

25. The system of claim 24 including at least one elongated T-slot intersecting said first mentioned T-slot, said T-clamps being receivable in said elongated T-slots.

26. The system of claim 23 including a centering pin extending upwardly from said table, and a centering opening in said fixture lower surface at the radial center of said T-slot, said centering pin being receivable in said centering opening.

27. The system of claim 11 including at least one entry opening in said slot to accommodate the entry of said T-clamp, said entry opening being larger than the head of said T-clamp.

28. The system of claim 11 wherein said means for supplying a cushion of air comprises a plurality of openings in the table surface connected to a source of compressed air.

29. A dual rotary index system comprising:
- a lower table having an upper surface,
- an upper table having an upper surface and a lower surface, said lower surface being in facing relationship with the upper surface of the lower table,
- means for supplying a cushion of pressurized air between said facing table surfaces so as to floatingly support said upper table on said lower table,
- a circular T-slot in said upper table lower surface,
- a T-clamp mounted in said lower table for vertical rectilinear movement and having an enlarged head portion received in said T-slot,
- means for selectively retracting said T-clamp toward said lower table surface so as to clamp said upper table to said lower table,
- said upper table being rotatably supported on said lower table for rotation about an axis coincident with the radial center of said circular T-slot,
- a workpiece fixture supported on said upper table upper surface,
- means for supplying a cushion of pressurized air between said upper table upper surface and said fixture so as to floatingly support said fixture thereon, and means interconnecting said fixture and upper table for confining said fixture to rotary motion on said upper table about a given center of rotation.

30. The rotary index system of claim 29 including two fixtures on said upper table, said fixtures having respective axes of rotation spaced laterally from the axis of rotation of said upper table.

31. The rotary index system of claim 29 including a plurality of said T-clamps and means for selectively retracting said T-clamps, said T-clamps being received in said T-slot and circumferentially spaced therearound.

32. The rotary index system of claim 29 including a centering pin extending upwardly out of said lower table upper surface and being received in an opening in said upper table lower surface.

33. The rotary index system of claim 29 wherein said means for confining said fixture to rotary motion comprises a centering pin in said upper table upper surface received in a downwardly opening hole in said fixture.

* * * * *